US012603391B2

(12) United States Patent
Jeong et al.

(10) Patent No.:  US 12,603,391 B2
(45) Date of Patent:  Apr. 14, 2026

(54) ALL-IN-ONE ELECTRODE STACK UNIT, MANUFACTURING METHOD THEREOF, AND LITHIUM SECONDARY BATTERY INCLUDING THE SAME

(71) Applicant: LG Energy Solution, Ltd., Seoul (KR)

(72) Inventors: Hyeok Jeong, Daejeon (KR); Su Taek Jung, Daejeon (KR); Seokhoon Jang, Daejeon (KR); Soon Kwan Kwon, Daejeon (KR); Byeong Kyu Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 719 days.

(21) Appl. No.: 17/801,062

(22) PCT Filed: Dec. 16, 2021

(86) PCT No.: PCT/KR2021/095128
§ 371 (c)(1),
(2) Date: Aug. 19, 2022

(87) PCT Pub. No.: WO2022/169111
PCT Pub. Date: Aug. 11, 2022

(65) Prior Publication Data
US 2023/0083763 A1    Mar. 16, 2023

(30) Foreign Application Priority Data

Feb. 5, 2021    (KR) ........................ 10-2021-0016995
Feb. 5, 2021    (KR) ........................ 10-2021-0016996

(51) Int. Cl.
H01M 50/46        (2021.01)
H01M 10/0585      (2010.01)
(Continued)

(52) U.S. Cl.
CPC ..... H01M 50/461 (2021.01); H01M 10/0585 (2013.01); H01M 50/403 (2021.01);
(Continued)

(58) Field of Classification Search
CPC ............ H01M 50/403; H01M 50/434; H01M 50/446; H01M 50/46; H01M 50/461
See application file for complete search history.

(56) References Cited

U.S. PATENT DOCUMENTS 5,882,721 A      3/1999  Delnick
2014/0093784 A1  4/2014  Kwon et al.
(Continued)

FOREIGN PATENT DOCUMENTS

CN     104393217 A  *  3/2015  .......... H01M 50/449
CN     104600240 A     5/2015
(Continued)

OTHER PUBLICATIONS

Mechanical properties of UV-cured urethane films. J. Appl. Polym. Sci., 38: 627-643 (Year: 1989).*
(Continued)

*Primary Examiner* — Allison Bourke
*Assistant Examiner* — Travis L. Martin
(74) *Attorney, Agent, or Firm* — Lerner David LLP

(57) ABSTRACT

An all-in-one electrode stack unit includes
  a first electrode, a second electrode, and a separation layer
    interposed between the first electrode and the second
    electrode.
The separation layer is a photocured PSA coating layer integrally formed on the first electrode.
The separation layer has a strength of 30 to 50 MPa and an adhesive force to the second electrode of 70 gf/20 mm to 90 gf/20 mm.
(Continued)

100

The first electrode, the separation layer, and the second electrode are laminated. The electrode stack unit is manufactured by a method. A lithium secondary battery includes the electrode stack unit.

11 Claims, 6 Drawing Sheets

(51) Int. Cl.

| | |
|---|---|
| *H01M 50/403* | (2021.01) |
| *H01M 50/42* | (2021.01) |
| *H01M 50/434* | (2021.01) |
| *H01M 50/446* | (2021.01) |
| *H01M 50/449* | (2021.01) |
| *H01M 50/463* | (2021.01) |
| *H01M 50/491* | (2021.01) |

(52) U.S. Cl.

CPC ......... *H01M 50/42* (2021.01); *H01M 50/434* (2021.01); *H01M 50/446* (2021.01); *H01M 50/449* (2021.01); *H01M 50/463* (2021.01); *H01M 50/491* (2021.01)

(56) References Cited

U.S. PATENT DOCUMENTS

| | | | |
|---|---|---|---|
| 2014/0227603 A1 | 8/2014 | Ogata | |
| 2014/0377613 A1 | 12/2014 | Kwon et al. | |
| 2014/0377614 A1 | 12/2014 | Kwon et al. | |
| 2014/0377615 A1 | 12/2014 | Kwon et al. | |
| 2014/0377616 A1 | 12/2014 | Kwon et al. | |
| 2015/0303002 A1 | 10/2015 | Yun et al. | |
| 2016/0028064 A1 | 1/2016 | Choi et al. | |
| 2016/0177136 A1 | 6/2016 | Park et al. | |
| 2016/0186021 A1 | 6/2016 | Park et al. | |
| 2016/0268625 A1 | 9/2016 | Choi et al. | |
| 2017/0170441 A1 | 6/2017 | Arnold et al. | |
| 2017/0346130 A1 | 11/2017 | Maeda et al. | |
| 2018/0034028 A1 | 2/2018 | Jung et al. | |
| 2018/0131011 A1* | 5/2018 | Ali .................. H01M 10/0565 |

| | | | |
|---|---|---|---|
| 2018/0166682 A1 | 6/2018 | Lee et al. | |
| 2018/0316045 A1 | 11/2018 | Kawabe et al. | |
| 2019/0190065 A1 | 6/2019 | Abouali et al. | |
| 2020/0243850 A1 | 7/2020 | Hibino et al. | |
| 2020/0274195 A1 | 8/2020 | Son et al. | |
| 2020/0280056 A1 | 9/2020 | Zheng et al. | |
| 2020/0381688 A1* | 12/2020 | Song ........................ H01M 4/62 |
| 2021/0008789 A1* | 1/2021 | Wei ........................ H01M 4/625 |
| 2021/0098814 A1 | 4/2021 | Lee | |
| 2021/0098817 A1 | 4/2021 | Lee | |
| 2021/0202953 A1* | 7/2021 | Takauji ............... H01M 50/403 |
| 2021/0344044 A1 | 11/2021 | Lee et al. | |

FOREIGN PATENT DOCUMENTS

| | | | |
|---|---|---|---|
| JP | H10334877 A | 12/1998 | |
| JP | 2013219006 A | 10/2013 | |
| JP | 2017095698 A | 6/2017 | |
| JP | 6657135 B2 | 3/2020 | |
| JP | 2020119887 A | 8/2020 | |
| JP | 6883973 B2 | 6/2021 | |
| KR | 101393534 B1 | 5/2014 | |
| KR | 20140100628 A | 8/2014 | |
| KR | 20150020147 A | 2/2015 | |
| KR | 101542096 B1 | 8/2015 | |
| KR | 20150122320 A | 11/2015 | |
| KR | 101578367 B1 | 12/2015 | |
| KR | 20160112266 A | 9/2016 | |
| KR | 20170085053 A | 7/2017 | |
| KR | 101887603 B1 | 8/2018 | |
| KR | 20180116907 A | 10/2018 | |
| KR | 20190036724 A | 4/2019 | |
| KR | 102101831 B1 | 4/2020 | |
| KR | 20200042344 A | 4/2020 | |

OTHER PUBLICATIONS

CN 104393217 A translation (Year: 2015).*

Extended European Search Report including Written Opinion for Application No. 21923589.2 dated Aug. 12, 2024. 10 pgs.

Search report from International Application No. PCT/KR2021/095128, mailed Apr. 4, 2022.

* cited by examiner

100

130

120

110

140

200

230
220a
220
210
240

ALL-IN-ONE ELECTRODE STACK UNIT, MANUFACTURING METHOD THEREOF, AND LITHIUM SECONDARY BATTERY INCLUDING THE SAME

CROSS-REFERENCE TO RELATED APPLICATIONS

The present application is a national phase entry under 35 U.S.C. § 371 of International Application No. PCT/KR2021/095128 filed on Dec. 16, 2021, which claims priority from and the benefit of Korean Patent Application No. 10-2021-0016995 filed on Feb. 5, 2021, and Korean Patent Application No. 10-2021-0016996 filed on Feb. 5, 2021, all of which are incorporated herein by reference in their entireties.

TECHNICAL FIELD

The present disclosure relates to an all-in-one electrode stack unit, a method of manufacturing same, and a lithium secondary battery including the same.

BACKGROUND

Due to the rapid increase in the use of fossil fuels, the demand for the use of alternative energy or clean energy is increasing, and as part thereof, the fields that are being studied most actively are the fields of power generation and power storage using electrochemistry.

At present, a secondary battery is a representative example of an electrochemical device that utilizes such electrochemical energy, and the range of use thereof tends to be gradually expanding.

Recently, along with the increase of the technological development and demand for mobile devices such as portable computers, portable phones, and cameras, the demand for secondary batteries has also sharply increased as an energy source. Among such secondary batteries, many studies have been conducted on a lithium secondary battery that exhibits high energy density and operating potential, has a long cycle life and a low self-discharge rate, and they are now commercialized and widely used.

In addition, as interest in environmental issues grows, studies are frequently conducted on an electric vehicle, a hybrid electric vehicle, etc. which can replace a vehicle using fossil fuels such as a gasoline vehicle and a diesel vehicle, which are one of the main causes of air pollution. Although a nickel metal hydride secondary battery is mainly used as a power source for the electric vehicle and the hybrid electric vehicle, research on the use of a lithium secondary battery having high energy density and discharge voltage is actively being conducted, a part of which are in the commercialization stage.

Such a lithium secondary battery is manufactured by a process which includes coating a cathode or anode active material, a binder, and a conductive material onto a current collector in the form of a slurry, drying it to form an electrode mixture layer and so prepare a cathode and an anode, interposing a separator between the cathode and the anode, laminating them and incorporating the laminated electrode assembly in a battery case together with the electrolytic solution.

Further, the electrode assembly can be manufactured in a manner in which the respective components are stacked or folded, but can be manufactured in a manner in which a unit cell is manufactured as an electrode stack unit including an electrode and a separator, and then stacked or folded.

A method 10 for manufacturing the electrode stack unit according to the related art is shown in FIG. 1.

Referring to FIG. 1, a separator 12 is stacked on a first electrode 11, a second electrode 13 is stacked on the separator 12, which is then laminated by a laminating device 14, and then cut by a cutter 15, thereby manufacturing a unit cell 16. At this time, optionally, another separator 17 may also be further stacked on the other surface of the first electrode 11 on which the separator 12 is not stacked.

That is, conventionally, as each configuration, the first electrode 11, the separator 12, and the second electrode 13 are sequentially stacked as separate members, and then laminated to manufacture the unit cell. However, in this case, high heat and pressure must be utilized to ensure sufficient adhesive force between the separator and the electrode. High heat and pressure cause problems such as cracking of the active material, which eventually causes problems such as deterioration of secondary battery performance, occurrence of short circuit defects, and reduction of yield. Further, in order for the separator to ensure sufficient heat resistance and strength, an SRS separator, in which an organic-inorganic mixed layer is formed on the separator substrate, has been developed, but this has a problem that it takes a lot of process time to separately manufacture and apply such a separator, and the cost increases.

Therefore, there is an urgent need to develop an all-in-one electrode stack unit technology that can perform the role of a separator even without manufacturing a separate separator, while solving such a problem and solving the problem of the adhesive force between the electrode and the separator.

SUMMARY OF THE DISCLOSURE

An object of the present subject is to solve the problems of the conventional technology as described above and the technical problems that have been requested from the past.

Specifically, an object of the present disclosure is to provide an all-in-one electrode stack unit in which an electrode and a separation layer as a separator are integrated in order to prevent electrode distortion due to lamination defects appearing in the process of laminating the electrode and the separator, and yield reduction due to the occurrence of wrinkles in separators, and a method of manufacturing same.

Another object of the present disclosure is to provide an all-in-one electrode stack unit capable of improving the adhesive force between the separation layer and the electrode, having excellent strength and elongation characteristics, and improving the safety of the secondary battery, and a method of manufacturing same.

In order to achieve the above object, according to one aspect of the present disclosure, there is provided an all-in-one electrode stack unit comprising:

a first electrode, a second electrode, and a separation layer interposed between the first electrode and the second electrode, wherein the separation layer is a photocured pressure sensitive adhesive (PSA) coating layer integrally formed on the first electrode, wherein the separation layer has a strength of 30 to 50 MPa, and an adhesive force to the second electrode of 70 gf/20 mm to 90 gf/20 mm, and wherein the first electrode, the separation layer, and the second electrode are laminated.

At this time, the photocured PSA coating layer may be a polymer coating layer containing ceramic particles.

In one specific embodiment, the ceramic particles may have an average diameter (D50) of 10 nm to 500 nm, and examples thereof may be at least one selected from the group consisting of AlN, BN, BeO, $SrTiO_3$, $SnO_2$, $CeO_2$, MgO, NiO, CaO, ZnO, $ZrO_2$, $Y_2O_3$, $Al_2O_3$, $TiO_2$, and SiC.

In another specific embodiment, the polymer may be an acrylate-based or epoxy-based monomer, an acrylate-based or epoxy-based oligomer, or a polymer of the monomer and the oligomer.

Meanwhile, in one specific embodiment, the separation layer may have a patterned structure.

Further, the separation layer may be composed of two or more layers, each separation layer has a patterned structure, and each separation layer may have a pattern different from that of an adjacent separation layer.

When the separation layer is composed of two or more layers, the pattern of each of the respective separation layers is a line type pattern in which the coated part and the uncoated part appear alternately, and an angle of the line formed by the patterns of the adjacent separation layer may be 10 degrees to 90 degrees.

Regardless of how many layers the separation layer is composed of, the total thickness of the separation layer may be 1 μm to 5 μm, the total porosity may be 20 to 60%, and the average diameter (D50) of the pores may be 0.01 μm to 1 μm.

The separation layer formed in this way may have an elongation of 20% to 50%.

Meanwhile, in one specific embodiment, the all-in-one electrode stack unit may further include a separator on the other surface of the first electrode that does not face the separation layer.

According to another aspect of the present disclosure, there is provided a method of manufacturing the all-in-one electrode stack unit, the method comprising the steps of:

(a) coating and curing a PSA (pressure sensitive adhesive) solvent-free ink in a breathable structure on the first electrode to form a separation layer;

(b) stacking a second electrode on the separation layer; and (c) laminating the first electrode, the separation layer, and the second electrode.

The PSA solvent-free ink may contain ceramic particles, a monofunctional monomer, a polyfunctional monomer, an oligomer, and an initiator, and may contain 10 to 30% by weight of the ceramic particles, 45 to 65% by weight of the monofunctional monomer, 10 to 15% by weight of the polyfunctional monomer, 5 to 10% by weight of the oligomer, and 0.1 to 0.8% by weight of the initiator.

Meanwhile, in one specific embodiment, the PSA solvent-free ink may be coated onto the first electrode by inkjet printing, wherein the PSA solvent-free ink may have a viscosity at room temperature of 5 to 100 cP.

The curing of the PSA solvent-free ink coated on the first electrode in this way may be performed by UV irradiation using an LED lamp.

Furthermore, in one specific embodiment, a sheet-type separator is laminated on the other surface of the first electrode on which the separation layer is not formed in step (a), the step (c) laminates the sheet-type separator, the first electrode, the separation layer, and the second electrode, and the method of manufacturing the electrode stack unit may further include cutting the sheet-type separator so as to correspond to the first electrode or the second electrode after the step (c).

Meanwhile, according to yet another aspect of the present disclosure, there is provided a lithium secondary battery comprising the all-in-one electrode stack unit.

DETAILED DESCRIPTION

Figure 1:
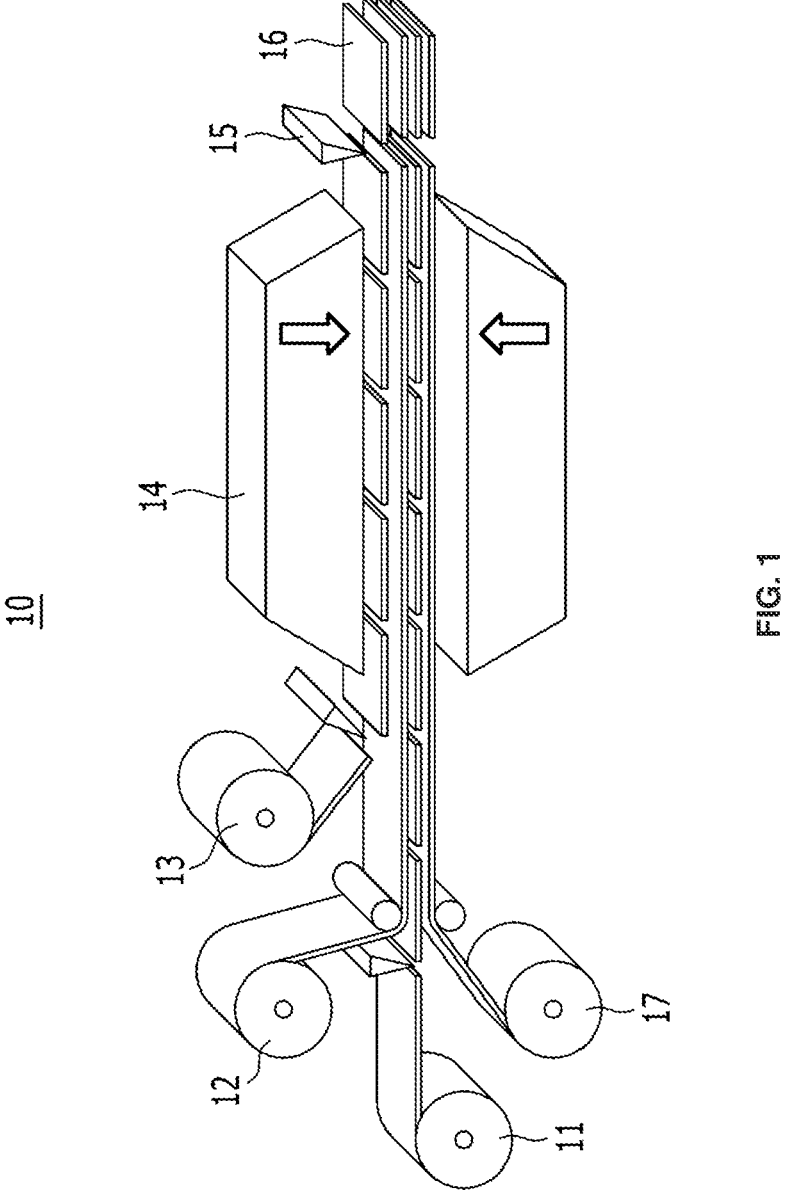
FIG. 1 is a schematic view showing a method of manufacturing an electrode stack unit according to the related art.

Hereinafter, the present disclosure will be described in more detail for a better understanding of the present disclosure.

Terms or words used in the present specification and claims should not be construed as limited to ordinary or dictionary terms, and the present disclosure should be construed with meanings and concepts that are consistent with the technical idea of the present disclosure based on the principle that the inventors may appropriately define concepts of the terms to appropriately describe their own disclosure in the best way.

The technical terms provided herein is merely used for the purpose of describing particular embodiments only, and is not intended to be limiting of the present disclosure. The singular forms "a," "an," and "the" are intended to include the plural forms as well, unless the context clearly indicates otherwise.

Further, throughout the specification, when a portion is referred to as "including" a certain component, it means that the portion can further include other components, without excluding the other components, unless otherwise stated.

According to one embodiment of the present disclosure, there is provided an all-in-one electrode stack unit comprising:

a first electrode, a second electrode, and a separation layer interposed between the first electrode and the second electrode, wherein the separation layer is a photocured PSA coating layer integrally formed on the first electrode, wherein the separation layer has a strength of 30 to 50 MPa, and an adhesive force to the second electrode of 70 gf/20 mm to 90 gf/20 mm, and wherein the first electrode, the separation layer, and the second electrode are laminated.

That is, conventionally, a separator is laminated as a separate member on the electrode and laminated to manufacture an electrode stack unit, but according to the present disclosure, a photocured PSA coating layer can be integrally formed on the first electrode, thereby improving the adhesive force and providing a strong separation layer by a simpler method.

The photocured PSA coating layer may be a polymer coating layer containing ceramic particles.

Here, the ceramic particles may have an average diameter (D50) of 10 nm to 500 nm.

The particle diameter (D50) means a particle size (diameter) at a point of 50% in the cumulative distribution of the number of particles relative to the diameter. Specifically, the D50 can be measured by using a laser diffraction method. Specifically, the powder to be measured is dispersed in a dispersion medium, and then introduced into a commercially available laser diffraction particle size analyzer (e.g., Microtrac S3500). When the particles pass through the laser beam, the diffraction pattern difference according to the particle size is measured to calculate the particle size distribution. The D50 can be measured by calculating the particle diameter corresponding a point of 50% in the cumulative distribution of the number of particles relative to the particle diameter in the analyzer.

When the ceramic particles are too small outside the above range, there are difficulties in the coating process, and when the ceramic particles are too large, the thickness of the coating layer becomes too thick, coating is difficult, sufficient strength or heat resistance cannot be ensured, and therefore, it is difficult to act as a separation layer, and the adhesive force to the electrode may be lowered, which is not preferable.

The type of such ceramic particles is not particularly limited as long as an oxidation and/or reduction reaction do not occur in the operating voltage range of the secondary battery applied as inorganic particles (e.g., 0~5V based on Li/Li$^+$), but it is preferable that the ionic conductivity is high and the density is small For example, the ceramic particles may be, preferably, at least one selected from the group consisting of (a) high dielectric constant inorganic particles having a dielectric constant of 1 or more, 5 or more, preferably 10 or more, (b) inorganic particles having piezoelectricity, (c) thermal conductive inorganic particles, and (d) inorganic particles having a lithium-ion transfer capability, and specifically, it may be at least one selected from the group consisting of AlN, BN, BeO, SrTiO$_3$, SnO$_2$, CeO$_2$, MgO, NiO, CaO, ZnO, ZrO$_2$, Y$_2$O$_3$, Al$_2$O$_3$, TiO$_2$, and SiC.

The ceramic particles may be contained in an amount of 10 to 30% by weight based on the total weight of the separation layer.

When the content of the ceramic particles is less than 10% by weight outside the above range, the content of the polymer becomes excessively large, an empty space formed between the ceramic particles decreases and the pore size and porosity reduces, thereby reducing mobility of lithium ions, which is not suitable as a separator. On the other hand, when the content is greater than 30% by weight, the adhesive force of the particles may be weakened, and thus the mechanical properties of the final separation layer may be deteriorated, which is not preferable.

Further, the polymer may be an acrylate-based or epoxy-based monomer, an acrylate-based or epoxy-based oligomer, or a polymer of the monomer and the oligomer.

That is, the photocured PSA coating layer can be formed through a process in which a solvent-free ink including the ceramic particles, a monomer and/or oligomer to be polymerized into said polymer, and an initiator to initiate polymerization of said monomer and/or oligomer is coated onto the first electrode and then cured.

More specifically, the all-in-one electrode stack unit is manufactured by including the steps of:
(a) coating and curing a PSA (pressure sensitive adhesive) solvent-free ink in a breathable structure on the first electrode to form a separation layer;

(b) stacking a second electrode on the separation layer; and
(c) laminating the first electrode, the separation layer, and the second electrode.

Here, the PSA solvent-free ink may include ceramic particles; at least one selected from the group consisting of a monomer and an oligomer; and an initiator as explained above.

Specifically, it may include all of ceramic particles, monomers, oligomers, and initiators, and more specifically, it may include ceramic particles, monofunctional monomers, polyfunctional monomers, oligomers, and initiators.

The monomers and oligomers may be specifically epoxy/acrylic monomers or oligomers.

Since the epoxy/acrylate-based material has the properties of an epoxy resin, it has good strength, flexibility, adhesive force, curability, etc., strong chemical resistance, and good heat resistance and durability, and therefore, is more preferable to be used as a separation layer.

The monomer can be selected from, for example, monofunctional monomers such as BA (Butyl acrylate), 2-EHA (2-Ethyl hexyl acrylate), HEA (2-Hydroxyethyl acrylate), SA (stearyl acrylate), MMA (Methyl methacrylate), IBOA (Isobornyl acrylate), IDA (Isodecyl acrylate), LA (Lauryl acrylate), CA (Caprolactone acrylate), and BZA (Benzyl acrylate); and polyfunctional monomers such as TMPTA (Trimethylolpropane triacrylate), PETA (Pentaerythritol triacrylate), TAOEIC (Tris(2-acryloyloxy-ethyl)isocyanurate), GPTA (Glycerine (PO)3 acrylate), and THEICTA (Tris(2-hydroxyethyl)isocyanurate triacrylate).

The oligomer can be selected from, for example, HDDA (1,6-hexandiol diacrylate), TCDDA (Tricyclodecane dimethanol diacrylate), PEG200DA (Polyethylene glycol 400 diacrylate), TTEGDA (Tetraethylene glycol diacrylate), TPGDA (Tripropylene glycol diacrylate), DPGDA (Dipropylene glycol diacrylate), TEGDA (Triethylene glycol diacrylate), and the like.

Further, the initiator that initiates the polymerization of the monomer and the oligomer is a photocuring initiator, and a general initiator capable of initiating photopolymerization by generating radicals by irradiation with UV or the like, such as an acetophenone-based compound, a biimidazole-based compound, a triazine-based compound, an oxime-based compound, a benzoin-based compound, a hydroxyketone-based compound, an aminoketone-based compound, or a phosphine oxide-based compound, can be used without limitation.

Since specific materials of these initiators are disclosed in the art, detailed descriptions thereof will be omitted herein.

On the other hand, since the contents of such ceramic particles, monomers, oligomers, and initiators also affect the physical properties of the separation layer, it is also preferable to adjust the content appropriately.

Specifically, the ceramic particles may be contained in an amount of 10 to 30% by weight based on the total weight of the PSA solvent-free ink.

When the content of the ceramic particles is less than 10% by weight outside the above range, the content of monomers and oligomers becomes too large, an empty space formed between the ceramic particles decreases and the pore size and porosity reduces, thereby reducing mobility of lithium ions, which is not suitable as a separator. On the other hand, when the content is greater than 30% by weight, the adhesive force of the particles may be weakened, and thus the mechanical properties of the final separation layer may be deteriorated, which is not preferable.

Meanwhile, the initiator may be contained in an amount of 0.1 to 0.8% by weight based on the total weight of the PSA solvent-free ink.

When the content of the initiator is too small outside the above range, curing may not be sufficiently performed, and when the content of the initiator is too large, it is not possible to obtain a separation layer having desired physical properties such as a decrease in adhesive force, which is not preferable.

More specifically, when the PSA solvent-free ink includes ceramic particles, a monofunctional monomer, a polyfunctional monomer, an oligomer, and an initiator, it may contain 10 to 30% by weight of the ceramic particles, 45 to 65% by weight of the monofunctional monomer, 10 to 15% by weight of the polyfunctional monomer, 5 to 10% by weight of the oligomer, and 0.1 to 0.8% by weight of the initiator.

In the case of the monofunctional monomer, it can be used to ensure the adhesive force and elongation of the separation layer, and in the case of the polyfunctional monomer, it can be used to ensure the shrinkage and strength of the separation layer after curing, and the oligomer can be used to ensure the viscosity of the PSA solvent-free ink and increase the strength and elongation of the separation layer.

Therefore, when the content of the monofunctional monomer is small outside the above range, or the content of the polyfunctional monomer and the oligomer is relatively high, the sufficient adhesive force and elongation cannot be ensured. On the other hand, when the content of monofunctional mono is high and the content of the polyfunctional monomer or the content of the oligomer content is relatively small, sufficient strength cannot be obtained, which is not preferable.

The separation layer prepared in this way may have a strength of 30 to 50 MPa as described above.

When the strength is less than 30 MPa outside the above range, it may not function as a separation layer, or the separation layer may be deformed or torn during lamination in the process of manufacturing the electrode stack unit, which is not preferable. When the strength is greater than 50 MPa, the adhesive force or elongation may decrease, which is not preferable.

The strength was measured at room temperature using a testing machine UTM (manufactured by Zwick/Roell). The measurement sample is prepared by coating a dog-bone-shaped separation layer with a thickness of 1.0 mm on a release-treated (Al-anodized) plate according to ASTM-D638 standard, and then subjecting to UV curing (ultraviolet wavelength: 395 nm, 3 seconds). Then, when the dog-bone specimen is pulled to both sides at a speed of 10 mm/min, the strength at the time when the separation layer specimen broke is measured.

Further, the separation layer may have an adhesive force to the second electrode of 70 gf/20 mm to 90 gf/20 mm as described above.

When the adhesive force is too low outside the above range, the life characteristics of the secondary battery are not good, and it is practically difficult to secure a high adhesive force that deviates from the above range, which is not preferable.

The adhesive force is measured as follows. A separation layer is coated (thickness: 10 μm) onto the first electrode punched out to a size of 20 mm×150 mm, and subjected to UV curing (UV wavelength: 395 nm, 3 seconds), and then the second electrode is punched out to a size of 20 mm×145 mm and laminated, and then passed through a roll laminator at 100° C. and adhered. At this time, the speed of the roll laminator is 0.4 m/min, and the pressure is 2 kgf/cm².

Next, after mounting on a UTM device (LLOYD Instrument LF Plus), the second electrode is pulled at a measurement speed of 100 mm/min at room temperature, and the force of peeling from the separation layer is measured.

Meanwhile, the separation layer may have a patterned structure.

Here, the patterned structure is not limited as long as it has a certain pattern, and can be applied in various ways. A dot shape, a line shape, a polygonal shape, etc. are all available.

Figure 2:
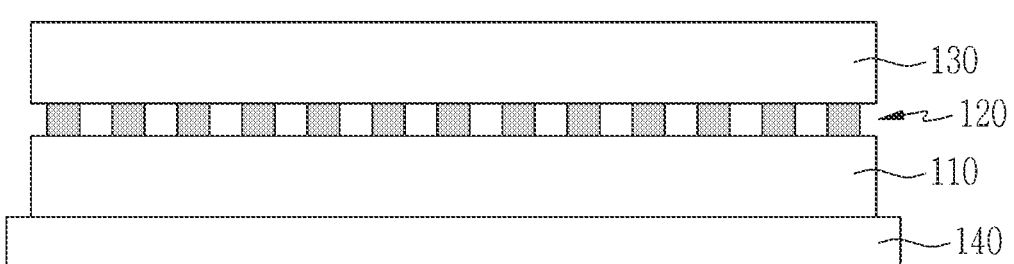
FIG. 2 is a cross-sectional view of an all-in-one electrode stack unit in which a separation layer is formed as one layer according to an embodiment of the present disclosure.
Figure 3:
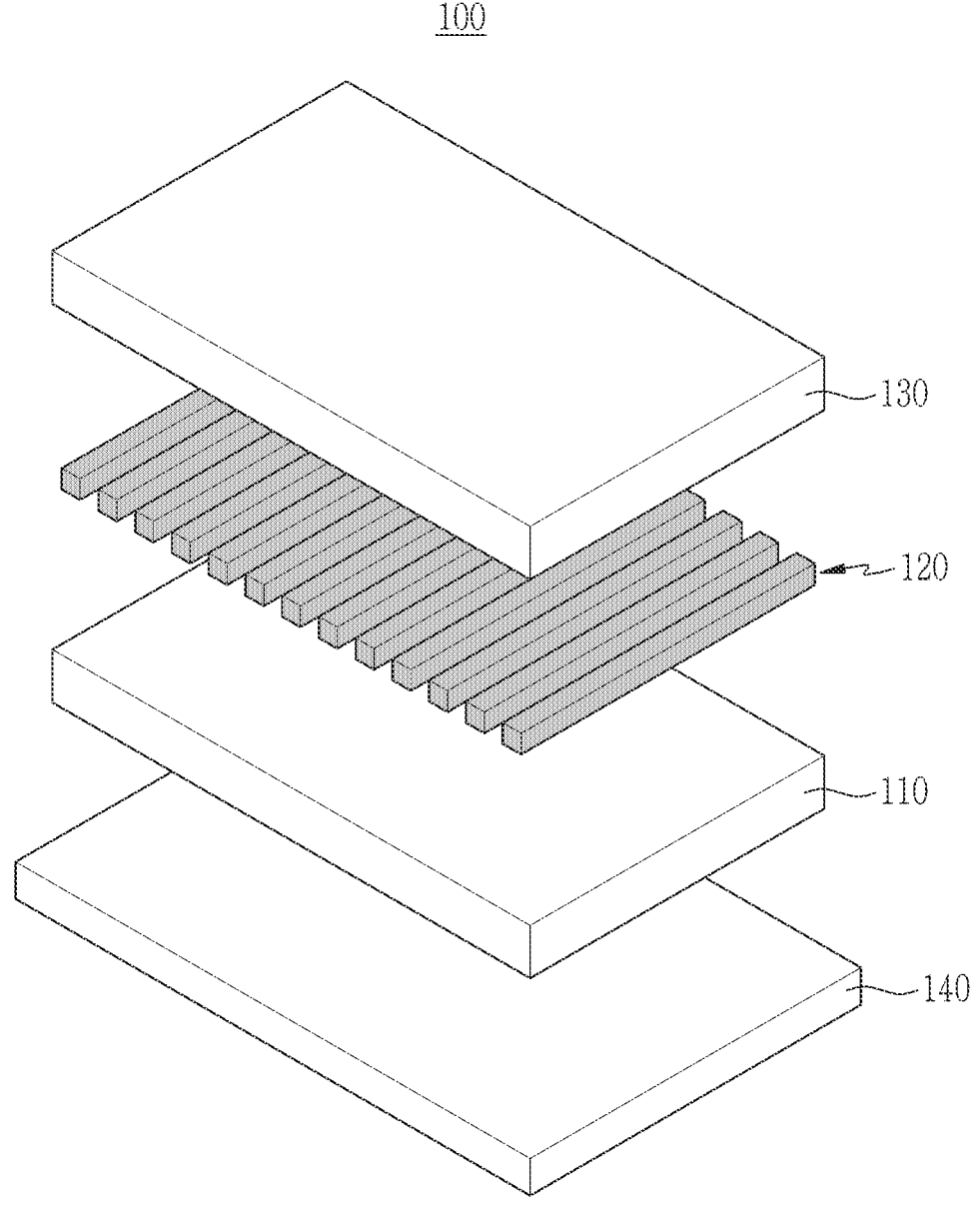
FIG. 3 is an exploded perspective view of the electrode stack unit of FIG. 2.

FIG. 2 show a cross-sectional view of an all-in-one electrode stack unit 100 including a separation layer having a patterned structure according to one embodiment, and FIG. 3 shows an exploded perspective view of the electrode stack unit 100.

Referring to FIGS. 2 and 3, the separation layer 120 is formed on the first electrode 110, and the second electrode 130 is formed on the separation layer 120.

At this time, the separation layer 120 has a line type patterned structure in which the coated part and the uncoated part appear alternately.

Through such a patterned structure, the porosity of the separation layer can be adjusted.

Further, the all-in-one electrode stack 100 may further include a separator 140 on the other surface of the first electrode 110 that does not face the separation layer 120.

On the other hand, the separation layer is composed of two or more layers, each separation layer has a patterned structure, and each separation layer may have a pattern structure different from that of an adjacent separation layer.

At this time, the patterned structure of each separation layer is not limited, and various structures are possible. In one example, the pattern of each separation layer is a line type pattern in which a coated part and an uncoated part appear alternately, and the angle of the line formed by the patterns of the adjacent separation layer may be 10 degrees to 90 degrees.

Figure 4:
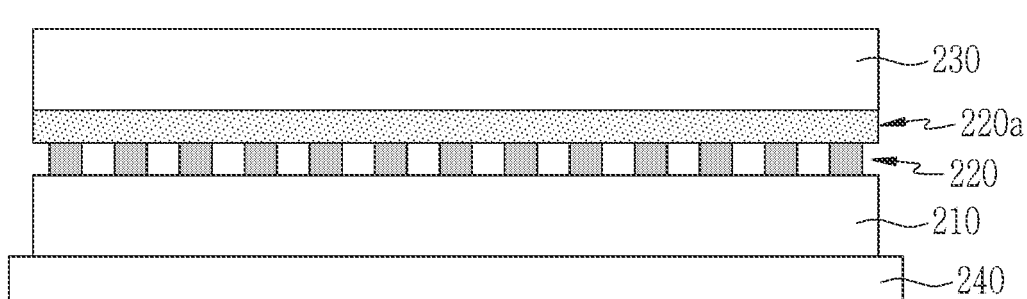
FIG. 4 is a cross-sectional view of an all-in-one electrode stack unit in which a separation layer is formed of two layers according to another embodiment of the present disclosure.
Figure 5:
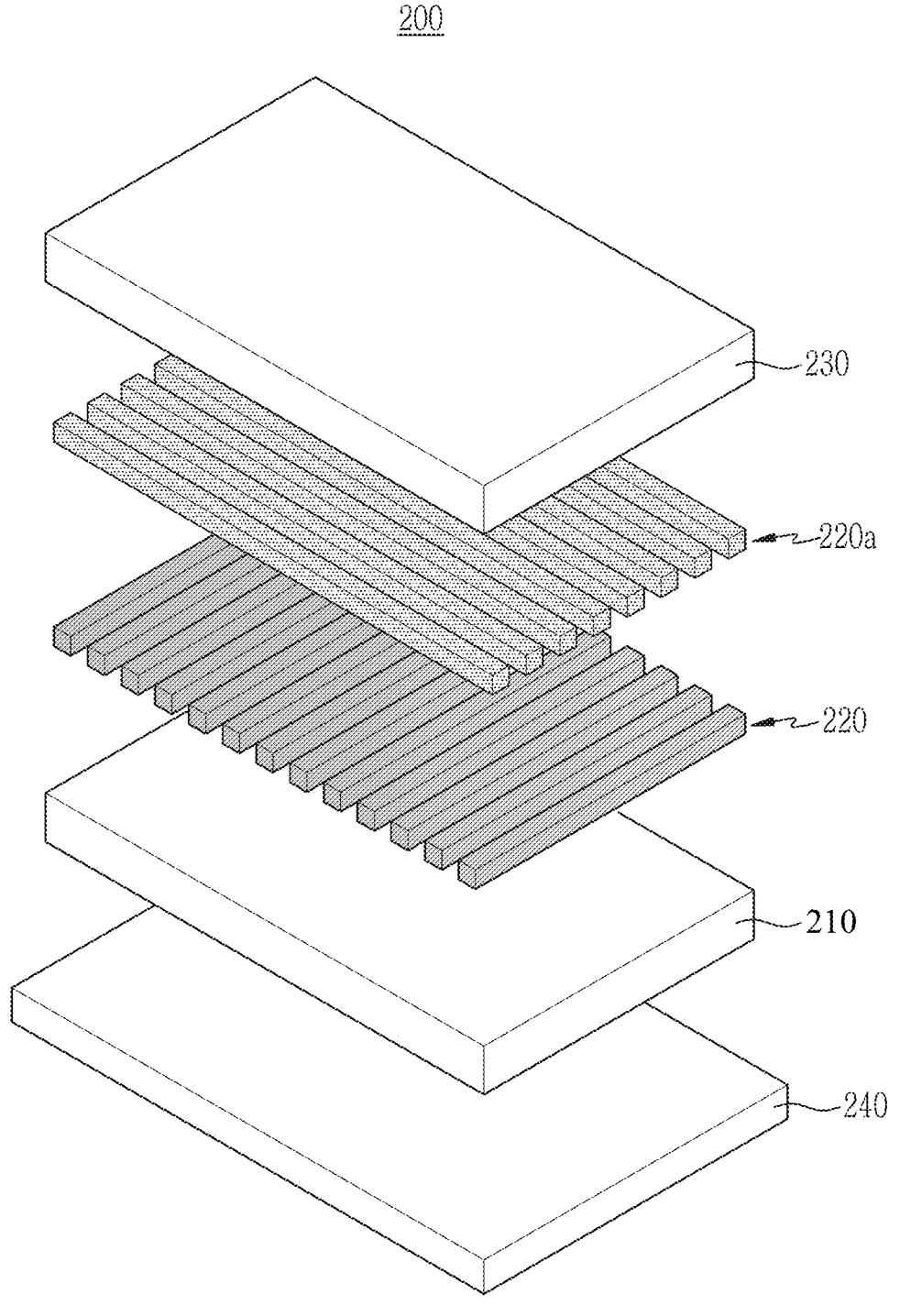
FIG. 5 is an exploded perspective view of the electrode stack unit of FIG. 4.

In order to facilitate understanding of these configurations, FIG. 4 shows a cross-sectional view of the electrode stack unit 200 formed with two separation layers 220 and 220a, and FIG. 5 is an exploded perspective view of the electrode stack unit 200.

Referring to FIGS. 4 and 5, first, the first separation layer 220 is formed on the first electrode 210 so as to have a uniform line type patterned structure. Then, the second separation layer 220a is formed so as to have a line type patterned structure so that it forms an angle of about 90 degrees which is an angle different from that of the first separation layer 220.

Further, the second electrode 230 is formed on the second separation layer 220a.

In the figure, only the configuration in which the first and second separation layers 220 and 220a are formed is shown, but it goes without saying that three or more separation layers may be formed.

Further, the all-in-one electrode stack unit 200 may further include a separator 240 on the other surface of the first electrode 210 that does not face the separation layer 220.

Figure 6:
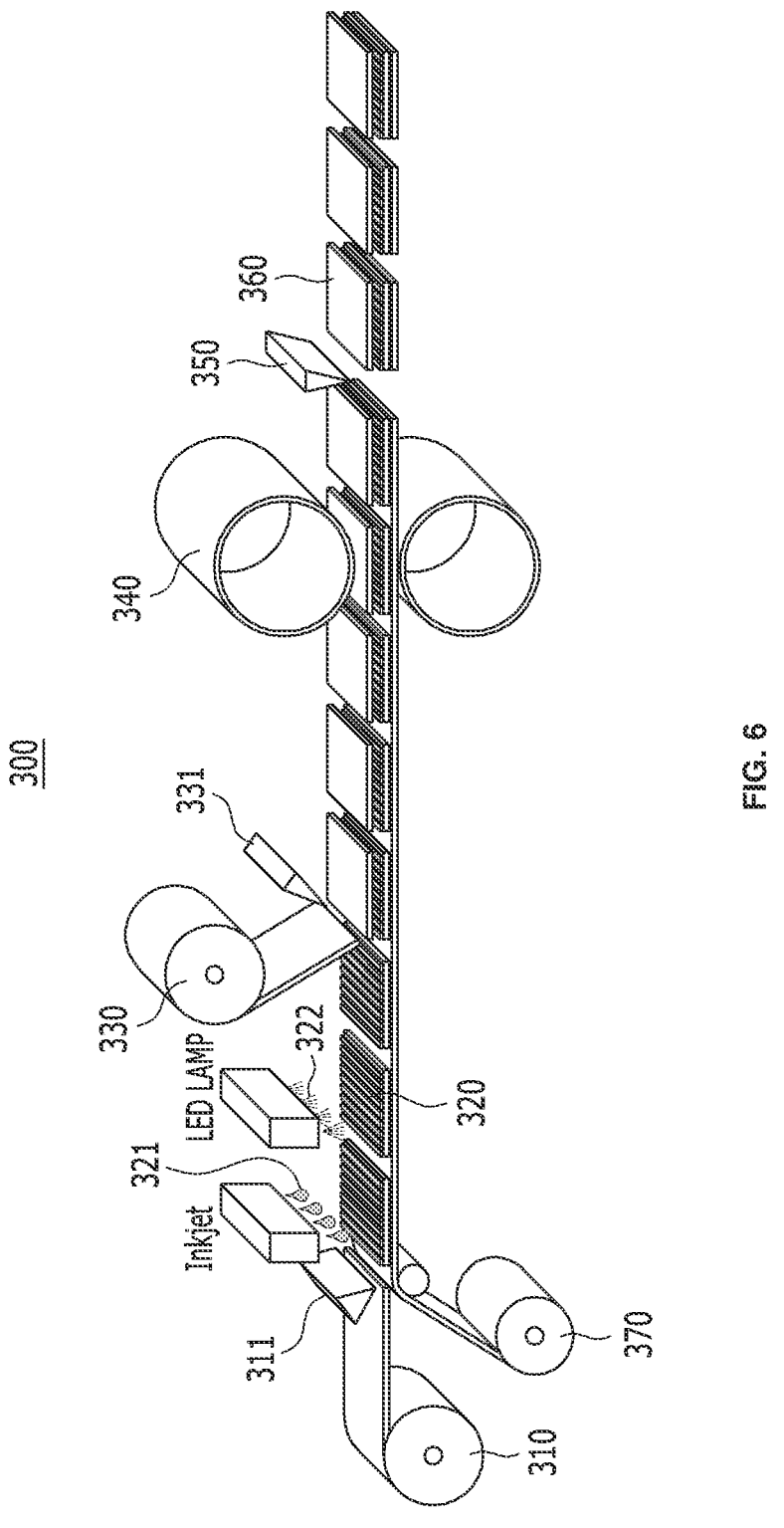
FIG. 6 is a schematic view showing a method of manufacturing the all-in-one electrode stack unit of FIG. 4.

Meanwhile, FIG. 6 shows a method 300 for manufacturing such an all-in-one electrode stack unit.

Referring to FIG. 6, first, the first electrode 310 is cut into unit electrodes by a cutter 311, and a PSA solvent-free ink 321 is coated onto the cut first electrode 310.

At this time, the method of coating the PSA solvent-free ink 321 onto the first electrode is not limited, but in order to properly coat the PSA solvent-free ink 321, specifically, it may be coated by inkjet printing.

When using this method of inkjet printing, the discharge amount can be adjusted up to several picoliters, and thus, it is easy to adjust the porosity of the laminated separator and to implement the size of the pores, and it is easy to adjust the size of the pattern structure described later, which is thus preferable.

Therefore, the viscosity of the PSA solvent-free ink 321 for smoothly discharging the PSA solvent-free ink 321 by such a method such as inkjet printing may be a viscosity at room temperature of 5 to 100 cP, more specifically 8 to 50 cp, and more specifically 10 to 20 cp. The viscosity is measured in which the Brookfield DV2T LV TJ10 model device is used with the PSA solvent-free ink at 25° C., the spindle part of the corresponding model is replaced with a cone and a plate, and a CPA-40Z cone is applied and measured at 10 rpm.

When the viscosity is too low outside the above range, it is difficult to coat an appropriate amount of the ink on the first electrode, and when the viscosity is too high, discharge of the ink is impossible, which is not preferable.

After the coating, a separation layer is formed through a curing process.

The curing is performed by UV irradiation 322 using an LED lamp. Specifically, the curing can be performed by irradiating UV at a short wavelength of 350 nm to 450 nm, specifically, a short wavelength of 380 nm to 400 nm under an output of 0.5 W/cm$^2$ to 1.0 W/cm$^2$ for 1 to 3 seconds.

On the other hand, the curing causes a shrinkage as compared with the coating area of the PSA solvent-free ink, wherein the shrinkage, which is the ratio of the shrunken area to the original area, may be less than 3%.

When the shrinkage is too large outside the above range, not only it is not possible to secure sufficient strength of the separation layer, but also it is difficult to properly perform the function as the separation layer, The shrinkage after curing (%) can be calculated by (coating area−area after curing)/coating area×100 by measuring the area after curing relative to the coating area of PSA solvent-free ink.

The separation layer prepared in this way may have a total thickness of 1 to 5 μm, specifically 2 to 4 μm.

When the separation layer is too thin outside the above range, it cannot fully perform its role as a separation layer, and when the separation layer is too thick, the overall volume of the secondary battery may increase, which is not preferable.

Further, when the separation layer is two or more layers, the thickness of each separation layer is preferably less than 2 μm.

A total porosity of the separation layer may be 20 to 60%, and an average diameter (D50) of the pores may be 0.01 μm to 1 μm.

Therefore, when forming the separation layer, the spacing, shape, number of layers, etc. of the patterned structure can be adjusted to satisfy the above range.

When the porosity is too small outside the above range or the average diameter (D50) of the pores is too small, the ion transport capability is lowered, and the ion conductivity is lowered. When the porosity or average diameter of the pores (D50) is too large, the strength of the separation layer may be weakened, which is not preferable.

For the porosity of the separation layer, the separation layer is made to a certain size using inkjet equipment, and then the volume is calculated and weighed. The separator is immersed in n-butanol for 2 hours, taken out, and all n-butanol on the surface is removed, and then the weight is measured and calculated by the following formula.

Porosity $\varepsilon(\%)=W_w=W_d/\rho_b V_p \times 100$ ($W_w$: weight impregnated with n-butanol, $W_d$: weight of dried separator, $\rho_b$: density of n-butanol, $V_p$: volume of dried separator)

The average diameter of the pores is the value in which the upper surface of the separation layer is taken with an SEM photograph at a magnification of 2,500 times, and then among the surface pores found in the randomly sampled range (over 10 um in width, over 15 um in length) in the measured photograph, the major axis length is measured as the pore size, and the minimum number of pores to be measured is set to 10 or more, and the average of the pore sizes obtained after measurement is calculated.

Further, the separation layer may have an elongation of 20% to 50%.

When the elongation is too small outside the above range, is too small, a phenomenon of local tearing or cracking due to pressure may be appear, and when the elongation is too high, it cannot have strength as a separation layer, which is not preferable.

The elongation is measured at room temperature using a testing machine UTM (manufactured by Zwick/Roell). The measurement sample is prepared by coating a dog-bone-shaped separation layer with a thickness of 1.0 mm on a release-treated (Al-anodized) plate according to ASTM-D638-5 standard, and then subjecting to UV curing (ultraviolet wavelength: 395 nm, 3 seconds). Then, when the dog-bone specimen is pulled to both sides at a speed of 10 mm/min, the elongation at the time when the separation layer specimen broke is measured.

$$\text{Elongation (\%)}=\text{length at break/initial length}\times 100.$$

Since the separation layer that satisfies these conditions can sufficiently function as a separator for a lithium secondary battery while ensuring sufficient adhesive force to the electrode. Thus, it is essential to form the separation layer so as to satisfy these conditions.

Referring to FIG. 6 again, after curing is performed in this way to form the separation layer 320 having specific physical properties, a second electrode 330 is stacked on the separation layer 320 in a state of being cut into unit electrodes by a cutter 331.

Then, the first electrode 310, the separation layer 320, and the second electrode 330 are laminated by a laminating roll 340, thereby forming an electrode stack unit 360.

Meanwhile, as shown in FIG. 6, the first electrode 310 may be supplied in a state where the sheet-shaped separator 370 is stacked, on the other surface of the first electrode 310 on which the separation layer 320 is not formed.

At this time, the lamination may be performed on all of the sheet-shaped separator 370, the first electrode 310, the separation layer 320, and the second electrode 330, wherein the method 300 of manufacturing the electrode stack unit may further include cutting the sheet-shaped separator 370 by a cutter 350 so as to correspond to the electrodes 310 and 330 after lamination.

Meanwhile, according to another embodiment of the present disclosure, a lithium secondary battery including the all-in-one electrode stack unit is provided.

Such a lithium secondary battery may have a structure in which an electrode assembly including the all-in-one electrode stack unit is incorporated in a battery case together with an electrolytic solution.

The specific structure and manufacturing method of a lithium secondary battery are known in the art, and therefore, a detailed description thereof will be omitted herein.

Hereinafter, preferred examples of the present disclosure, comparative examples for comparing them, and experimental examples for evaluating them are described. However, it will be obvious to those skilled in the art that these examples are for illustrative purposes only and various changes and modifications can be made without deviating from the scope and spirit of the present description, and it goes without saying that such modifications and modifications fall within the scope of the appended claims.

PREPARATION EXAMPLE 1

2-EHA (2-ethyl hexyl acrylate):TMPTA(Trimethylolpropane triacrylate):PEG200DA (Polyethylene glycol 400 diacrylate):initiator (Irgacure369):$Al_2O_3$(D50: 200-300 nm) as the ceramic particles were mixed in a weight ratio of 40:19.5:20:0.5:20 to prepare a PSA solvent-free ink.

PREPARATION EXAMPLE 2

2-EHA (2-ethyl hexyl acrylate):TMPTA (Trimethylolpropane triacrylate):PEG200DA (Polyethylene glycol 400 diacrylate):initiator (Irgacure369):$Al_2O_3$ (D50: 200-300 nm) as the ceramic particles were mixed in a weight ratio of 70:5:4.5:0.5:20 to prepare a PSA solvent-free ink.

PREPARATION EXAMPLE 3

2-EHA (2-ethyl hexyl acrylate):TMPTA (Trimethylolpropane triacrylate):PEG200DA (Polyethylene glycol 400 diacrylate):initiator (Irgacure369):$Al_2O_3$ (D50:200-300 nm) as the ceramic particles were mixed in a weight ratio of 60:10:9:1:20 to prepare a PSA solvent-free ink.

PREPARATION EXAMPLE 4

2-EHA (2-ethyl hexyl acrylate):TMPTA (Trimethylolpropane triacrylate):PEG200DA (Polyethylene glycol 400 diacrylate):initiator (Irgacure369):$Al_2O_3$ (D50:200-300 nm) as the ceramic particles were mixed in a weight ratio of 60:10:9.5:0.5:20 to prepare a PSA solvent-free ink.

PREPARATION EXAMPLE 5

2-EHA (2-ethyl hexyl acrylate):TMPTA (Trimethylolpropane triacrylate):PEG200DA (Polyethylene glycol 400 diacrylate):initiator (Irgacure369):$Al_2O_3$ (D50:200-300 nm) as the ceramic particles were mixed in a weight ratio of 45:10:24.5:0.5:20 to prepare a PSA solvent-free ink.

PREPARATION EXAMPLE 6

2-EHA (2-ethyl hexyl acrylate):TMPTA (Trimethylolpropane triacrylate):PEG200DA (Polyethylene glycol 400 diacrylate):initiator (Irgacure369):$Al_2O_3$ (D50:200-300 nm) as the ceramic particles were mixed in a weight ratio of 50:15:14.5:0.5:20 to prepare a PSA solvent-free ink.

EXPERIMENTAL EXAMPLE 1

Using the PSA solvent-free ink prepared in Preparation Examples 1 to 6, the strength and elongation were measured as follows, and the results are shown in Table 1 below.

The strength was measured at room temperature using a testing machine UTM (manufactured by Zwick/Roell). The measurement sample was prepared by coating a dog-boneshaped separation layer with a thickness of 1.0 mm on a release-treated (Al-anodized) plate according to ASTM-D638 standard, and then subjecting to UV curing (ultraviolet wavelength:395 nm, 3 seconds). Then, when the dog-bone specimen was pulled to both sides at a speed of 10 mm/min, the strength at the time when the separation layer specimen broke was measured.

The elongation was performed in the same manner as the strength, and the time at which the separation layer specimen broke was measured, and then the elongation (%) was calculated as follows.

$$\text{Elongation (\%)=length at break/initial length} \times 100.$$

COMPARATIVE EXAMPLES 1 to 3, EXAMPLE 1

Manufacture of Electrode Stack Unit $LiNi_{0.4}Mn_{0.3}Co_{0.3}O_2$ as a cathode active material, a carbon black conductive material, and a PVdF binder were mixed in a weight ratio of 4.6:87.9:3.5:4 in an N-methylpyrrolidone solvent to prepare a cathode slurry, which was coated onto an aluminum current collector, and dry-rolled to prepare a cathode. The cathode was punched out to a size of 20 mm×150 mm.

The PSA solvent-free ink of Preparation Examples 1 to 6 was coated onto the cathode to have a line type pattern structure as shown in FIGS. 2 and 3 by inkjet printing, and subjected to UV curing for 3 seconds (UV Lamp, wavelength: 395 nm, output: 0.5~1 $W/cm^2$, etc.) to form a separation layer.

Further, MCMB (mesocarbon microbead), which is artificial graphite as an anode active material, a carbon black conductive material and PVdF binder were mixed in a weight ratio of 90:5:5 in N-methylpyrrolidone solvent to prepare a composition for forming an anode, which was coated onto the copper current collector to prepare an anode. The anode was punched out to a size of 20 mm×145 mm.

The anode was laminated on the separation layer, and then adhered through a roll laminator at 100° C. to prepare an electrode stack unit. At this time, the speed of the roll laminator was 0.4 m/min, and the pressure was 2 $kgf/cm^2$.

EXPERIMENTAL EXAMPLE 2

The electrode stack units prepared in Comparative Examples 1 to 3 and Example 1 were tested by the following methods, and shrinkage (%) after curing, and adhesive force (gf/20 mm) were measured. The results are shown in Table 1 below.

The shrinkage after curing (%) was calculated by (coating area−area after curing)/coating area×100 by measuring the area after curing relative to the coating area of PSA solvent-free ink.

For the measurement of the adhesive force, after mounting on a UTM device (LLOYD Instrument LF Plus), the second electrode was pulled at a measurement speed of 100 mm/min at room temperature, and the force of peeling from the separation layer was measured.

TABLE 1

| | Comparative Example 1 (Preparation Example 1) | Comparative Example 2 (Preparation Example 2) | Comparative Example 3 (Preparation Example 3) | Example 1 (Preparation Example 4) | Comparative Example 4 (Preparation Example 5) | Comparative Example 5 (Preparation Example 6) |
|---|---|---|---|---|---|---|
| Shrinkage after curing (%) | <3 | 7-8 | <3 | <3 | <3 | <3 |
| Strength (MPa) | 70 | 15 | 45 | 35 | 35 | 55 |
| Adhesive force (gf/20 mm) | <5 | 85-90 | 30-40 | 70-75 | 5-10 | 20-25 |
| Elongation (%) | <5 | 55-60 | 15-20 | 30 | 10 | 8-10 |
| Remarks | Adhesive NG Elongation NG | Strength NG | Adhesive NG | OK | Adhesive NG Elongation NG | Adhesive NG Elongation NG |

Referring to Table 1, it can be confirmed that when preparing PSA solvent-free ink, the content of monomers, oligomers, initiators, inorganic materials, etc. have an effect to satisfy sufficient strength, adhesive force, elongation, etc. according to the present disclosure, and otherwise, the effect intended by the present disclosure cannot be obtained.

Any person who has ordinary knowledge in the field to which the present disclosure pertains can make various applications and modifications within the scope of the present invention based on the above contents.

INDUSTRIAL APPLICABILITY

As described above, the all-in-one electrode stack unit and the manufacturing method thereof according to an embodiment of the present disclosure can integrate the electrode and the separation layer as a separator. Therefore, it is possible to simplify the manufacturing process and at the same time, solve the problems such as the electrode distortion, separator folding and the like that appear in the process of laminating the electrode and the separator, thereby increasing the yield of the electrode and improving the adhesion force to the electrode.

In addition, when applying the separation layer as described above, it is possible to easily adjust the type and content of the material forming the separation layer, whereby it is easy to secure excellent physical properties such as the desired adhesive force, strength, and elongation of the separation layer.

The invention claimed is:

1. An all-in-one electrode stack unit comprising:
a first electrode, a second electrode, and a separation layer interposed between the first electrode and the second electrode,
wherein the separation layer is a photocured pressure sensitive adhesive (PSA) coating layer integrally formed on the first electrode,
wherein the separation layer has a tensile strength of 30 to 50 MPa, and an adhesive force to the second electrode of 70 gf/20 mm to 90 gf/20 mm, and
wherein the first electrode, the separation layer, and the second electrode are laminated,
wherein the photocured PSA coating layer is a polymer coating layer containing ceramic particles,
wherein the polymer is an acrylate-based or epoxy-based monomer, an acrylate-based or epoxy-based oligomer, or a polymer of the monomer and the oligomer,
wherein the photocured PSA coating layer is obtained by curing a PSA solvent-free ink, and wherein the PSA solvent-free ink contains 10 to 30% by weight of ceramic particles, 45 to 65% by weight of a monofunctional monomer, 10 to 15% by weight of a polyfunctional monomer, 5 to 10% by weight of an oligomer, and 0.1 to 0.8% by weight of an initiator.

2. The all-in-one electrode stack unit according to claim 1, wherein:
the ceramic particles have an average diameter (D50) of 10 nm to 500 nm.

3. The all-in-one electrode stack unit according to claim 1, wherein:
the ceramic particles contain at least one particle selected from the group consisting of AlN, BN, BeO, $SrTiO_3$, $SnO_2$, $CeO_2$, MgO, NiO, CaO, ZnO, $ZrO_2$, $Y_2O_3$, $Al_2O_3$, $TiO_2$, and SiC.

4. The all-in-one electrode stack unit according to claim 1, wherein:
the separation layer has a patterned structure.

5. The all-in-one electrode stack unit according to claim 1, wherein:
the separation layer is composed of two or more layers, each separation layer has a patterned structure, and each separation layer has a pattern different from that of an adjacent separation layer.

6. The all-in-one electrode stack unit according to claim 5, wherein:
each of the respective separation layers includes alternating coated and uncoated parts defining a line-type pattern, and an angle defined by lines formed by the patterns of the adjacent separation layers is 10 degrees to 90 degrees.

7. The all-in-one electrode stack unit according to claim 1, wherein:
a total thickness of the separation layer is 1 μm to 5 μm.

8. The all-in-one electrode stack unit according to claim 1, wherein:
a total porosity of the separation layer is 20 to 60%, and an average diameter (D50) of the pores is 0.01 μm to 1 μm.

9. The all-in-one electrode stack unit according to claim 1, wherein:
the separation layer has an elongation of 20% to 50%.

10. The all-in-one electrode stack unit according to claim 1, further comprising:
a separator on a surface of the first electrode that does not face the separation layer.

11. A lithium secondary battery comprising the all-in-one electrode stack unit of claim 1.

* * * * *